United States Patent
Uematsu et al.

(10) Patent No.: US 6,991,429 B2
(45) Date of Patent: Jan. 31, 2006

(54) SEALING STRUCTURE OF SPINDLE BOLT, AND GAS TURBINE

(75) Inventors: Kazuo Uematsu, Hyogo (JP); Kazuharu Hirokawa, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 31 days.

(21) Appl. No.: 10/415,074

(22) PCT Filed: Oct. 10, 2002

(86) PCT No.: PCT/JP02/10550

§ 371 (c)(1),
(2), (4) Date: Apr. 25, 2003

(87) PCT Pub. No.: WO03/033879

PCT Pub. Date: Apr. 24, 2003

(65) Prior Publication Data

US 2004/0007830 A1 Jan. 15, 2004

(30) Foreign Application Priority Data

Oct. 10, 2001 (JP) .............................. 2001-312981

(51) Int. Cl.
*F01D 3/02* (2006.01)

(52) U.S. Cl. .............. 416/96 R; 416/97 R; 415/199.5; 415/115; 277/923; 403/408.1

(58) Field of Classification Search .............. 416/96 R, 416/97 R, 96 A, 198 A; 415/114, 115, 199.5, 415/99.4; 277/411, 421, 316, 923; 403/408.1
See application file for complete search history.

(56) References Cited

U.S. PATENT DOCUMENTS

| | | | | |
|---|---|---|---|---|
| 3,118,593 | A | * | 1/1964 | Robinson et al. ............ 415/194 |
| 3,661,475 | A | * | 5/1972 | Anderson et al. ........ 416/219 R |
| 3,680,979 | A | * | 8/1972 | Hansen et al. ........... 416/198 R |
| 3,749,516 | A | * | 7/1973 | Samurin et al. ............. 416/199 |
| 4,453,889 | A | * | 6/1984 | Sakata et al. ............. 416/198 A |
| 6,053,701 | A | | 4/2000 | Ichiryu et al. |
| 6,095,751 | A | | 8/2000 | Hirokawa et al. |
| 6,206,378 | B1 | | 3/2001 | Sakata et al. |

FOREIGN PATENT DOCUMENTS

| | | |
|---|---|---|
| EP | 1088976 | 4/2001 |
| JP | 7-189739 | 7/1995 |
| JP | 9-242505 | 9/1997 |
| JP | 10-121903 | 5/1998 |
| JP | 10-205302 | 8/1998 |
| JP | 10-252403 | 9/1998 |
| JP | 11-081910 | 3/1999 |
| JP | 11-173103 | 6/1999 |
| JP | 2001-098902 | 4/2001 |
| JP | 2001-098906 | 4/2001 |

* cited by examiner

*Primary Examiner*—Theresa Trieu

(74) *Attorney, Agent, or Firm*—Oblon, Spivak, McClelland, Maier & Neustadt, P.C.

(57) ABSTRACT

A first stage rotor disk (50a) and a connecting member (30) on the compressor side are fixed by a spindle bolt (20). The spindle bolt (20) is covered with a tubular member (100), between the first stage rotor disk (50a) and the connecting member (30) on the compressor side.

13 Claims, 15 Drawing Sheets

FIG.3
(a) 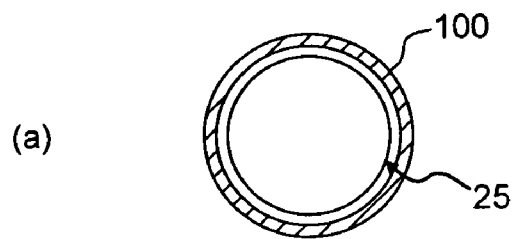
(b) 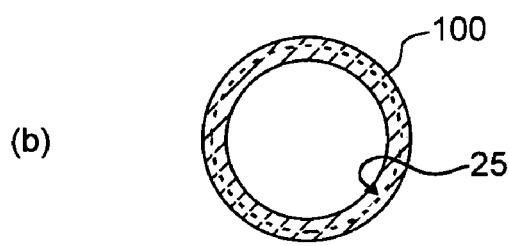
(c) 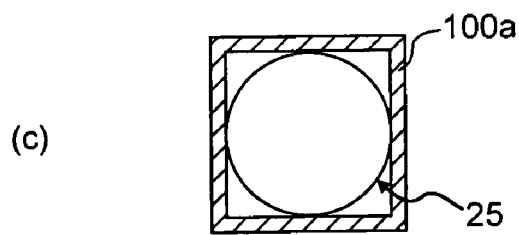
(d) 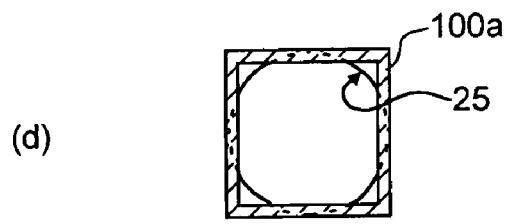
(e) 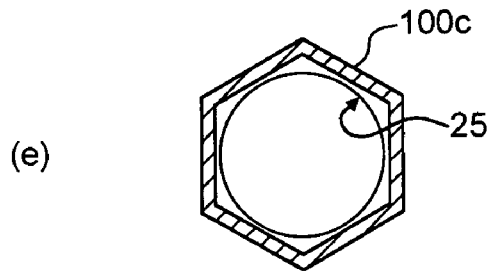

FIG.4
(a)
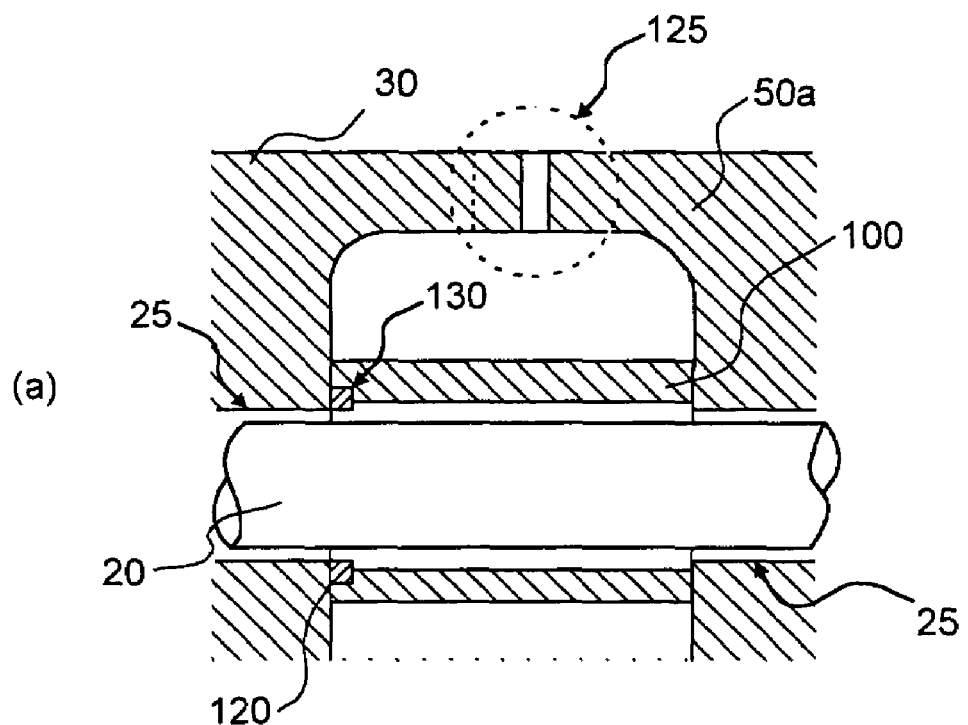
(b)
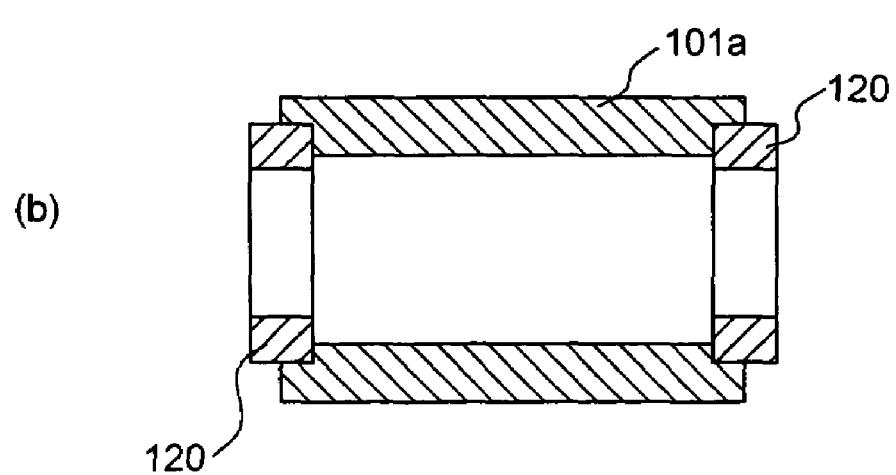

FIG.8
(a) 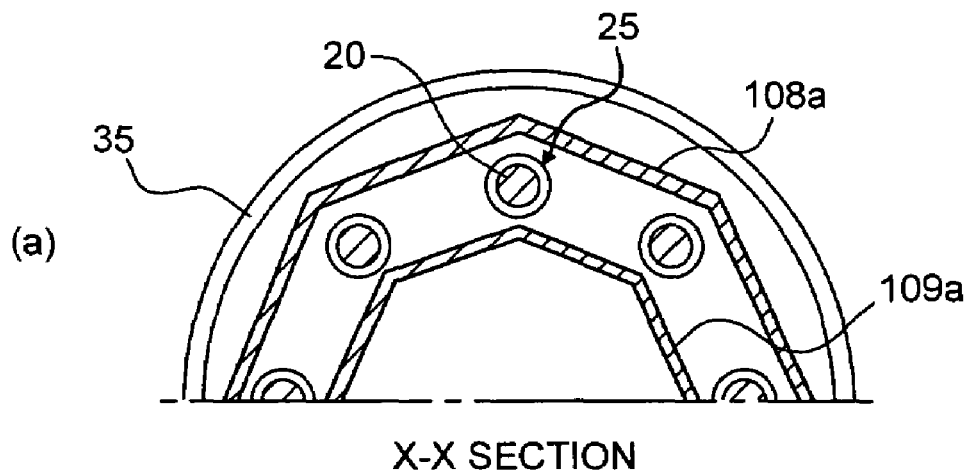
X-X SECTION
(b) 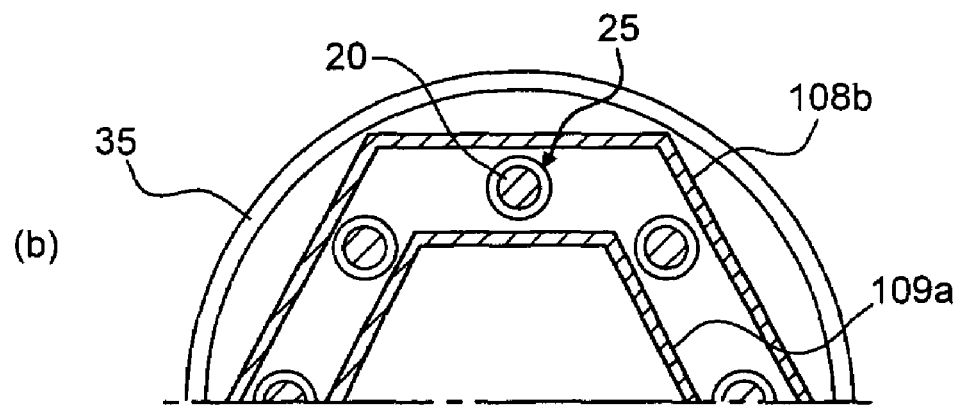
(c) 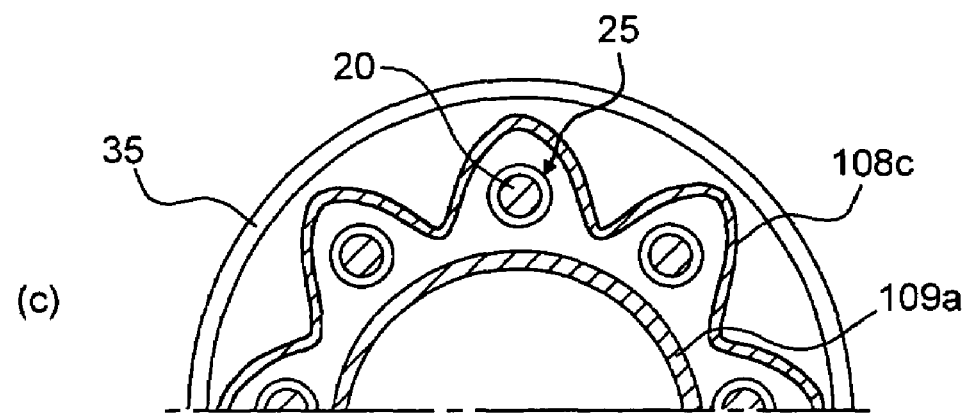

FIG.9
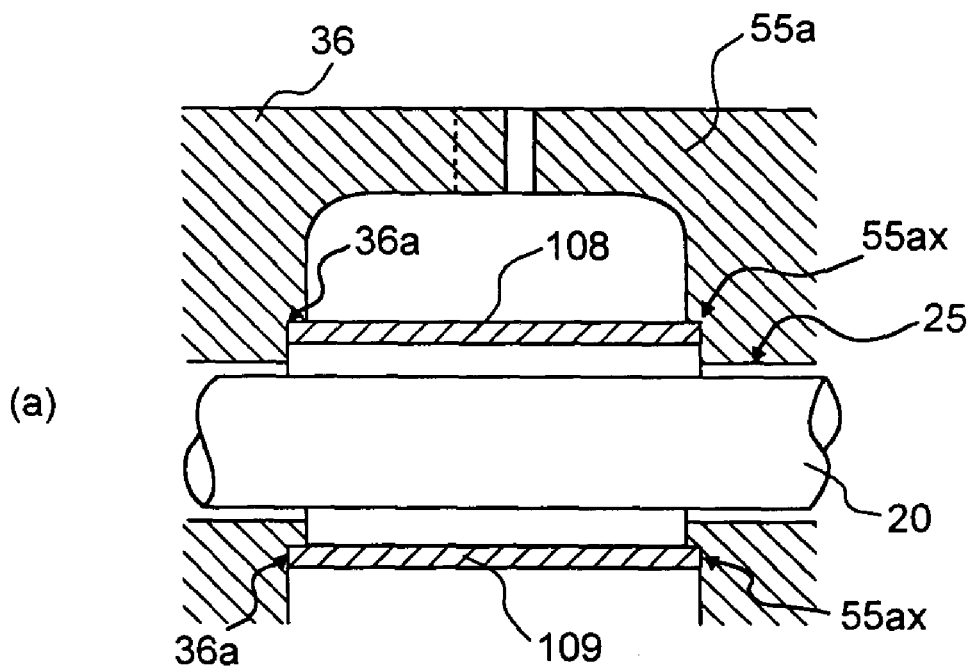
(a)
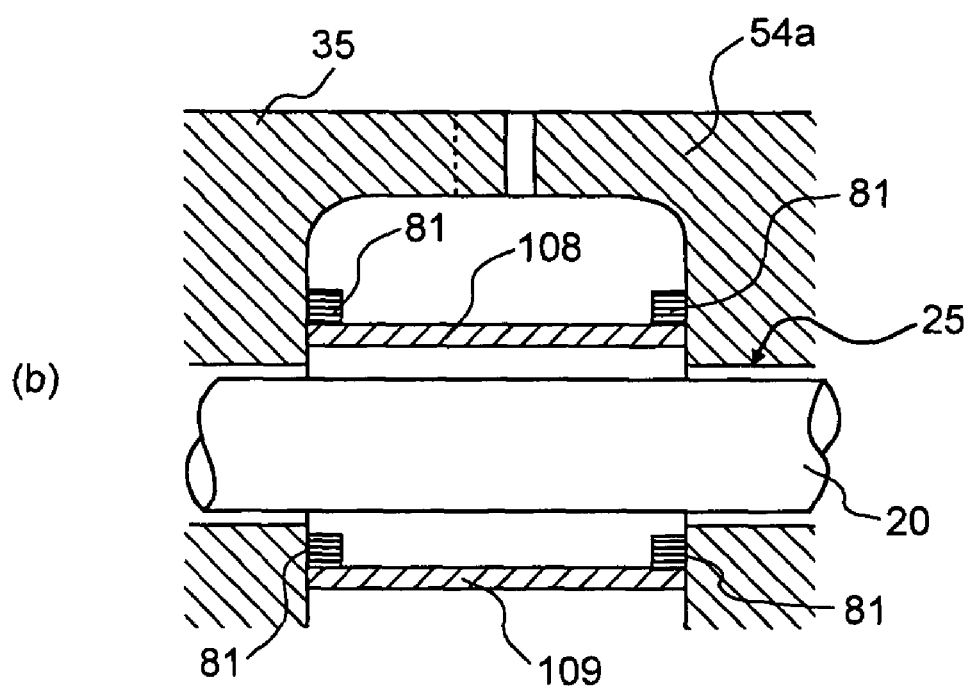
(b)

SEALING STRUCTURE OF SPINDLE BOLT, AND GAS TURBINE

TECHNICAL FIELD

The present invention relates to a gas turbine that uses steam as a cooling medium for hot members. More particularly, the present invention relates to a gas turbine in which steam leakage is decreased to increase the use efficiency of the steam, to thereby enable efficient operation, and a sealing structure for a spindle bolt connecting rotor disks.

BACKGROUND ART

A technique for cooling hot members, such as a rotor blade, a rotor disk, or a stationary blade in a gas turbine, by using steam instead of air as a cooling medium, is now being used, in order to increase the thermal efficiency in the gas turbine. This is due to the following reasons. The specific heat at constant pressure of dry steam is cp=1.86 kJ/kgK under a normal condition, which is a value almost twice as large as the specific heat at constant pressure of air, cp=1.00 kJ/kgK. Therefore, steam has a large heat capacity and a high endothermic effect, as compared with air of the same mass. Further, when wet steam is used as the cooling medium, the endothermic effect can be further increased, since the latent heat of vaporization for the wet amount can be also used for cooling. Hence, the cooling efficiency can be increased than when using air, and the turbine inlet temperature of the combustion gas can be increased, thereby enabling an improvement in the thermal efficiency.

In the conventional air cooling, air from a compressor is used as a cooling medium for rotor and stationary blades of the turbine. However, when this compressed air is used for cooling, the work that can be taken out from the turbine decreases. If steam is used instead of air, the cooling air for the rotor and stationary blades can be saved, and hence the work that can be recovered by the turbine increases by this amount, thereby the work that can be taken out from the turbine can be increased.

FIG. 15 shows a rotor disk in a gas turbine conventionally used. A plurality of first stage rotor disks 500a to 500d are fastened by a spindle bolt 520 and nuts 510, to thereby constitute a rotor 600 of a gas turbine. Spaces between the rotor disks 550, 551 and 552 become a path for flowing steam supplied to the rotor blade (not shown), and cooling steam is supplied from a hollow turbine main spindle 560 side. This steam flows through the path formed by the spaces 550 and 551, and is supplied to the rotor blade from the space between the first stage rotor disk 500a and the second stage rotor disk 500b.

However, since the steam pressure on the rotor disk side is higher than the air pressure on a compressor side, the steam on the rotor disk 500a side leaks towards the compressor side, through a bolt hole provided in the first stage rotor disk 500a. The amount of leakage is not large as seen from the whole feed rate of the steam, but recently, it is tried to suppress the steam leakage, even in a small amount, and to use the cooling steam as effectively as possible. Therefore, it is necessary to reduce the steam leakage in this part as much as possible.

It is therefore an object of the present invention to provide a gas turbine that can reduce the leakage of steam to be used for cooling the rotor blade and the like and increase the use efficiency of the steam, thereby enabling efficient operation, and a sealing structure of the spindle bolt for connecting the rotor disks.

DISCLOSURE OF THE INVENTION

A sealing structure of a spindle bolt according to the present invention is such that rotor disks and a connecting member on a compressor side are fixed by a spindle bolt, and between the first stage rotor disk and the connecting member on the compressor side, of a turbine rotor in a gas turbine having a steam path therein, the circumference of the spindle bolt is covered with a tubular member in which a section thereof vertical to the axial direction includes a section of a bolt hole for passing the spindle bolt therethrough, and the ends of the tubular member are made to abut on the first stage rotor disk and the connecting member on the compressor side, respectively.

In this sealing structure of this spindle bolt, the tubular member covers the circumference of the spindle bolt to thereby seal the steam leaking through the bolt hole provided in the first stage rotor disk by this tubular member. Therefore, since the steam leakage can be reduced to effectively use the steam, the operation cost can be reduced. The cooling steam is generated by the exhaust gas of the gas turbine, and after cooling the rotor blade, drives an intermediate pressure turbine and the like. Since the consumption of steam in this part can be suppressed, the thermal efficiency is improved as a steam and gas turbine combined cycle power plant. The tubular member in this invention includes not only the one in which the cross section vertical to the axial direction is circular, but also tubular members in which the cross section is polygonal such as triangular and quadrangular. The tubular member may be formed integrally with the rotor disk and the connecting member on the compressor side.

A sealing structure of the spindle bolt according to the next invention is such that rotor disks and a connecting member on a compressor side are fixed by a spindle bolt, and of a turbine rotor in a gas turbine having a steam path therein, a first annular member and a second annular member arranged inside the first annular member are arranged so that the ends thereof abut on the first stage rotor disks and the connecting member on the compressor side, and the spindle bolt is passed between the first annular member and the second annular member.

In this sealing structure of the spindle bolt, two annular members having a different outer dimension are arranged between the first stage rotor disk and the connecting member on the compressor side, and the spindle bolt is passed between these two annular members, to prevent the steam leaking from a bolt hole, through which the spindle bolt passes. Since steam leakage is reduced, and steam can be used effectively, the operation cost can be reduced. Since the consumption of steam in this part can be reduced, the thermal efficiency is improved as a steam and gas turbine combined cycle power plant. The annular member in this invention includes not only the one in which the cross section vertical to the axial direction is circular, but also annular members in which the cross section is polygonal such as triangular and quadrangular, and stelliform. The annular member may be formed integrally with the rotor disk and the connecting member on the compressor side.

A sealing structure of the spindle bolt according to the next invention is such that, in the sealing structure of the spindle bolt, a sealant is provided at least on one side of between the end of the tubular member or the annular member and the first stage rotor disk, and between the end of the tubular member or the annular member and the connecting member on the compressor side. In the sealing structure of the spindle bolt, a metal or ceramics sealant is provided at the end of the tubular member or the annular member, to increase the steam sealing performance. Therefore, since the steam leakage can be further reduced, the steam can be used more effectively, and the thermal efficiency as the steam and gas turbine combined cycle power plant is also improved.

A sealing structure of the spindle bolt according to the next invention is such that, in the sealing structure of the spindle bolt, a protrusion or a step that hinders the tubular member or the annular member from moving radially outwards of the rotor disk, is provided at least on one side of the first stage rotor disk and the connecting member on the compressor side.

In the sealing structure of the spindle bolt, a step or the like is provided in the first stage rotor disk or the like, so as to prevent the tubular member or the annular member from moving radially outwards of the rotor disk due to a centrifugal force. Since the rotor disk of the gas turbine rotates at a high speed, the structural members in the rotating system are subjected to a large centrifugal force. When the tubular member or the annular member is eccentric due to the centrifugal force, the rotation balance is lost and spindle vibration increases, thereby a trip of the gas turbine may occur. In this sealing structure, since the movement of the tubular member or the like is hindered by making the step or the like abut on the tubular member, a deviation of the tubular member or the like can be suppressed. As a result, since the gas turbine can be operated without losing the rotation balance, and hence a trip of the gas turbine can be suppressed.

A gas turbine according to the next invention is a gas turbine that has a plurality of rotor disks having a rotor blade in the periphery thereof, which cools the rotor blade or the rotor disk, and other hot members by steam. The gas turbine comprises a compressor that compresses air to produce combustion air, a combustor that supplies fuel to the combustion air produced by the compressor to generate combustion gas, and a turbine rotor having a feed path or a recovery path for the steam therein, in which rotor disks and a connecting member located on the compressor side are fixed by a spindle bolt, wherein between the first stage rotor disk and the connecting member, the circumference of the spindle bolt is covered with a tubular member in which a section thereof vertical to the axial direction includes a section of a bolt hole for passing the spindle bolt therethrough, and the opposite ends of the tubular member are made to abut on the first stage rotor disk and the connecting member on the compressor side, respectively.

This gas turbine uses a turbine rotor having a sealing structure, in which a tubular member covers the circumference of the spindle bolt, and steam leaking from a bolt hole provided in the first stage rotor disk is sealed by the tubular member. Therefore, steam leakage at the spindle bolt portion can be reduced. As a result, in this gas turbine, wasteful use of the cooling steam can be suppressed. Further, in a steam and gas turbine combined cycle power plant using this gas turbine, thermal efficiency can be increased.

A gas turbine according to the next invention is a gas turbine that has a plurality of rotor disks having a rotor blade in the periphery thereof, which cools the rotor blade or the rotor disk, and other hot members by steam. The gas turbine comprises a compressor that compresses air to produce combustion air, a combustor that supplies fuel to the combustion air produced by the compressor to generate combustion gas, and a turbine rotor having a feed path or a recovery path for the steam therein, in which rotor disks and a connecting member located on the compressor side are fixed by a spindle bolt, wherein a first annular member and a second annular member arranged inside the first annular member are arranged so that the ends thereof abut on the first stage rotor disks and the connecting member, and the spindle bolt is passed between the first annular member and the second annular member.

In this gas turbine, two annular members having a different outer dimension are arranged between the first stage rotor disk and the connecting member on the compressor side. The gas turbine uses a turbine rotor having a sealing structure, in which a spindle bolt is passed between these two annular members so as to prevent the steam leaking from a bolt hole, through which the spindle bolt passes. Therefore, steam leakage at the spindle bolt portion can be reduced. As a result, in this gas turbine, wasteful use of the cooling steam can be suppressed. Further, in a steam and gas turbine combined cycle power plant using this gas turbine, thermal efficiency can be increased.

BRIEF DESCRIPTION OF THE DRAWINGS

FIG. 3 shows a section of a tubular member and a section of a bolt hole;

FIG. 4 is a local sectional view that shows a sealing structure of a spindle bolt according to a first modified example in the first embodiment;

FIG. 8 shows an example of an annular member;

FIG. 9 is a local sectional view that shows a first modified example in the second embodiment;

BEST MODE FOR CARRYING OUT THE INVENTION

The present invention will be explained in detail, with reference to the drawings, but the present invention is not limited by the embodiments. The components in the embodiments include ones that can be assumed easily by those skilled in the art.

First Embodiment

Figure 1:
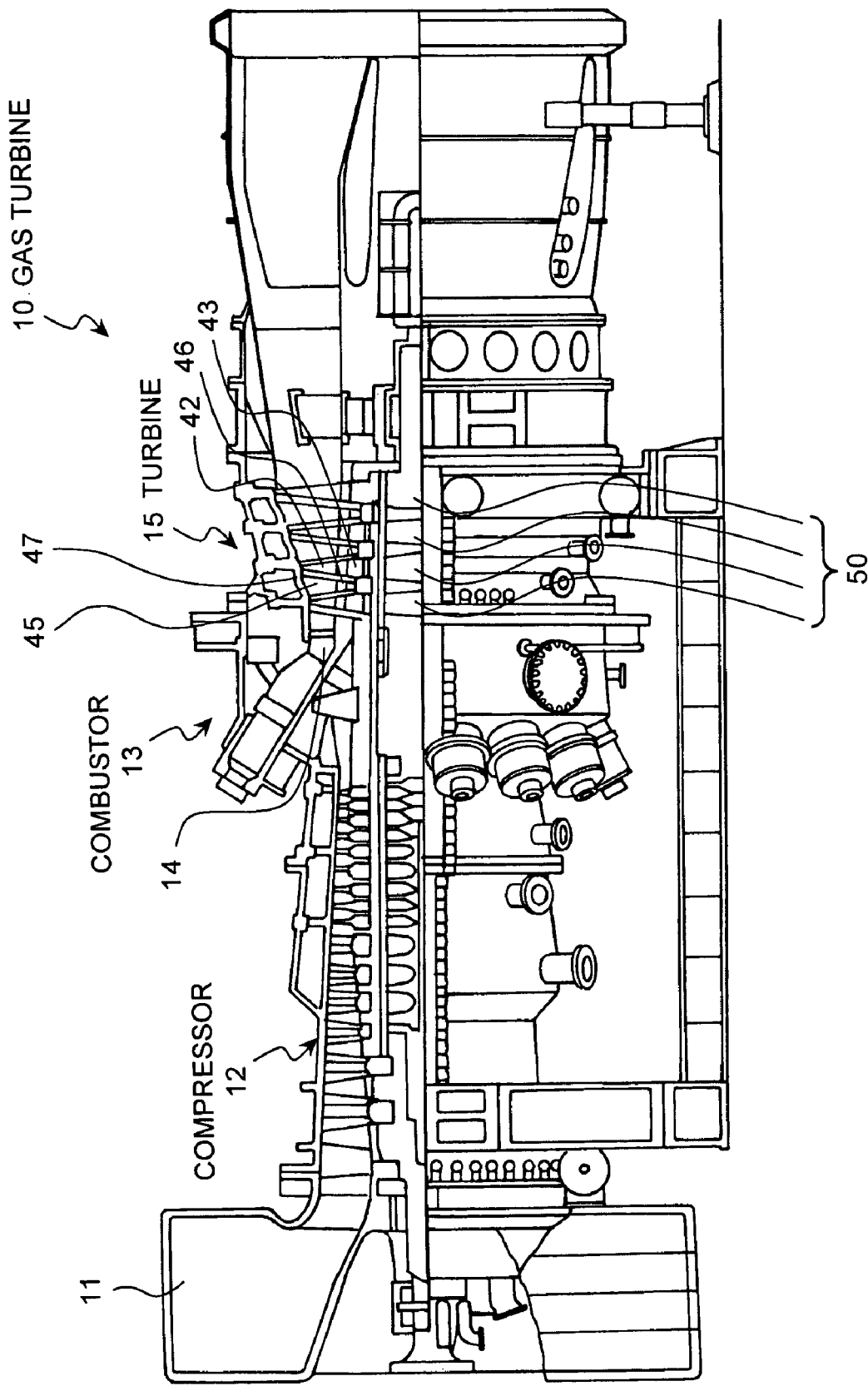
FIG. 1 shows a gas turbine according to a first embodiment of the present invention.

FIG. 1 shows a gas turbine according to a first embodiment of the present invention. A gas turbine 10 is for cooling hot members of the gas turbine, such as a rotor blade, a rotor disk, or a stationary blade by steam. Air taken in from an air intake 11 is compressed by a compressor 12, to become high temperature and high pressure compressed air, and is fed to a combustor 13. The combustor 13 supplies gas fuel such as natural gas or the like, or liquid fuel such as gas oil, light fuel oil or the like to the compressed air, to burn the fuel, to thereby generate high temperature and high pressure combustion gas. This high temperature and high pressure combustion gas is guided to a combustor tail pipe 14, and injected to a turbine 15.

The stationary blade and the rotor blade of the turbine 15 are cooled by steam, and this is supplied through a steam feed path (not shown) provided in a turbine main spindle 16. The steam supplied from the steam feed path changes the direction by 90 degrees in front of the rotor disk 50, is guided to a plurality of outer steam passes provided in the circumferential direction of the rotor disk 50, and is then supplied to the rotor blade. The rotor disks 50 are fixed by a plurality of spindle bolts (not shown) axially penetrating the rotor disks 50, to thereby constitute a rotor of multiple stages.

Figure 2:
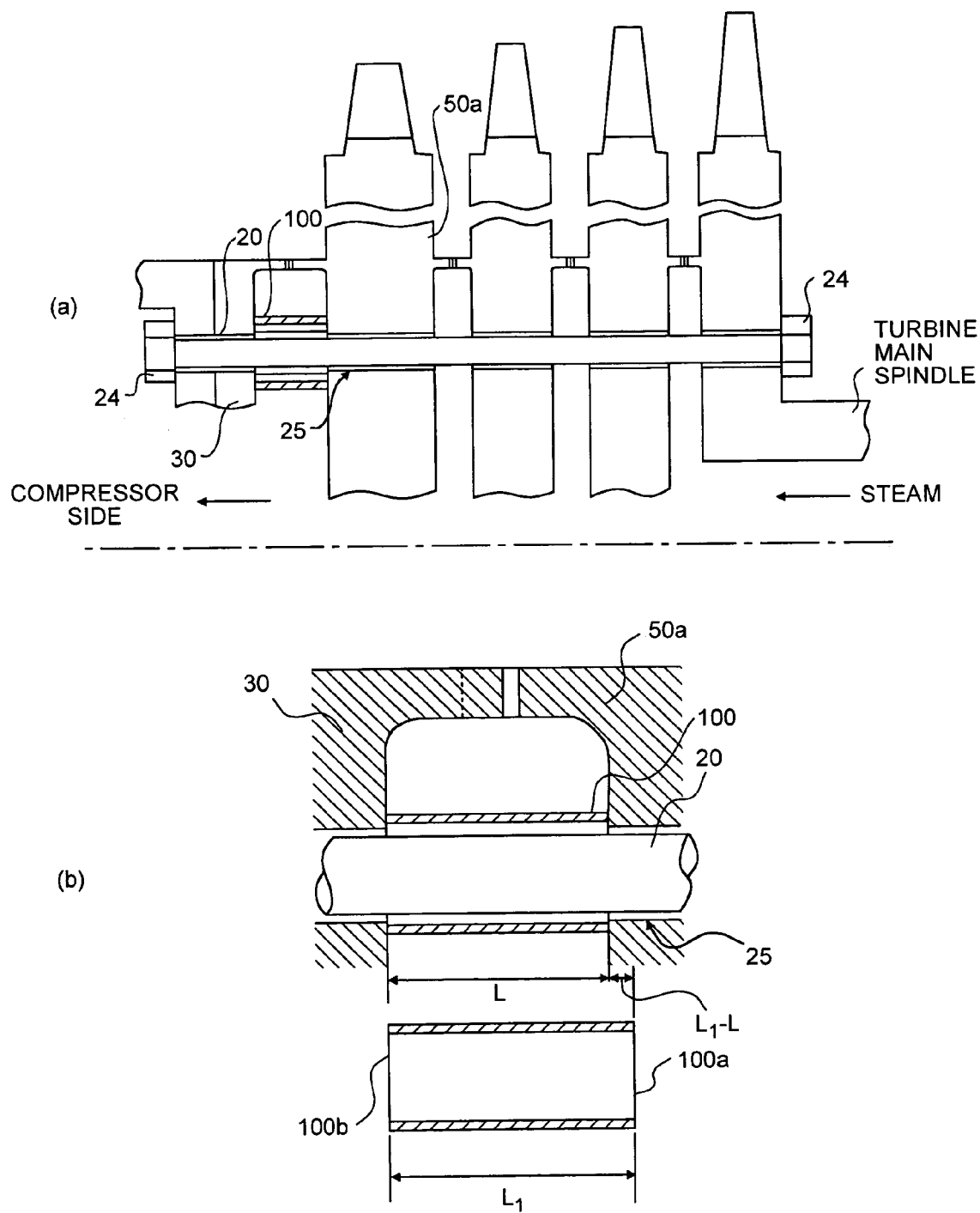
FIG. 2 is a partial enlarged view that shows a sealing structure of a spindle bolt according to this gas turbine.

FIG. 2 is a partially enlarged view that shows a sealing structure of a spindle bolt according to this gas turbine. This structure has a feature in that the spindle bolt connecting the rotor disks is covered by a tubular member, so as to prevent the leakage of steam from the high pressure side, from a gap between the spindle bolt and a bolt hole. As shown in FIG. 2, a first stage rotor disk 50a and a connecting member 30 on the compressor side are fastened by a spindle bolt 20 penetrating both the members. Between the first stage rotor disk 50a and the connecting member 30 on the compressor side, a tubular member 100 covers the spindle bolt 20.

The length L1 of this tubular member 100 is set slightly larger than a gap L between the first stage rotor disk 50a and the connecting member 30 on the compressor side (see FIG. 2(b)). When the first stage rotor disk 50a and the connecting member 30 on the compressor side are fastened by the spindle bolt 20, the tubular member shrinks, thereby becomes the same length as the gap L. The tubular member 100 shrinks by L1–L, and the tubular member is pressed against the first stage rotor disk 50a and the connecting member 30 on the compressor side by the resilience of this shrunken portion. As a result, the steam sealing performance increases by this portion.

Ends 100a and 100b of the tubular member 100 abut on the first stage rotor disk 50a and the connecting member 30 on the compressor side. The abutted portions of the tubular member 100 and the first stage rotor disk 50a and the like are machined smoothly, so that the steam passing through the space between the tubular member 100 and the first stage rotor disk 50a and the like is reduced as much as possible. The steam leaking from a bolt hole 25 on the first stage rotor disk 50a side and the spindle bolt 20 is confined within the tubular member 100, and hence steam leakage can be suppressed. According to the sealing structure of the spindle bolt, since the amount of steam leaking from the first stage rotor disk 50a to the compressor side can be suppressed, the use efficiency of the steam can be increased.

The relation between the section of the tubular member 100 and the section of the bolt hole 25 is explained in FIG. 3. FIGS. 3(a), (c) and (e) respectively show examples in which the external shape of the bolt hole 25 is included in the inner section of the tubular member 100 or the like. FIGS. 3(b) and (d) show examples in which the external shape of the bolt hole 25 is included between the inner wall and the external wall of the tubular member 100 or the like. In either case, it corresponds to the relation of "a section of a tubular member vertical to the axial direction includes a section of a bolt hole" in the present invention. As is clearly seen from these figures, the cross section of the tubular member 100 is not limited to a circular shape, and as shown in FIGS. 3(c) and (e), it includes polygonal shapes such as quadrangle and hexagon. Though not shown in these figures, an ellipse and one in which either the external shape or the inner diameter is circular and the other is polygonal are also included.

First Modified Example

FIG. 4 is a local sectional view that shows a sealing structure of a spindle bolt according to a first modified example in the first embodiment. The sealing structure of the spindle bolt has a feature in that a sealant is provided between the tubular member and the connecting member on the compressor side. At the end of the tubular member 100 used in this sealing structure, a step 130 is provided, and a sealing member 120 is put in this step 130. Since the temperature of the first stage rotor disk 50a and the like rises during the operation of the gas turbine, heat resistance is required for the sealing member 120. This sealing member 120 should also have resilience, so as to absorb elongation of the tubular member 100, a curvic coupling 125 and the like. A metal seal or a ceramics seal may be used for this sealing member 120, in order to satisfy such requirement.

In this example, the sealing member 120 is provided in the tubular member 100, but the sealing member 120 may be provided in the connecting member 30 on the compressor side or the first stage rotor disk 50a. In that case, if a spot facing is provided in the bolt hole 25, through which the spindle bolt passes, in the connecting member 30 on the compressor side or the like, and the sealing member 120 is fitted therein, stable sealing performance can be demonstrated, while suppressing a deviation of the sealing member. Therefore, it is preferable. As shown in FIG. 4(a), this sealing member 120 may be provided only on the connecting member 30 on the compressor side, but in order to exhibit higher sealing performance, as shown in FIG. 4(b), it is desired to provide the sealing member 120 at the opposite ends of the tubular member 101a.

When the first stage rotor disk 50a and the connecting member 30 on the compressor side are combined, after the spindle bolt 20 is inserted in the tubular member 100, nuts 24 (see FIG. 2) are fastened to assemble. When the nuts 24 are fastened, the sealing member 120 provided in the tubular member 100 shrinks axially due to the clamping force of the nuts 24, and hence the steam leaking from the bolt hole 25 in the first stage rotor disk 50a can be sealed.

Second Modified Example

Figure 5:
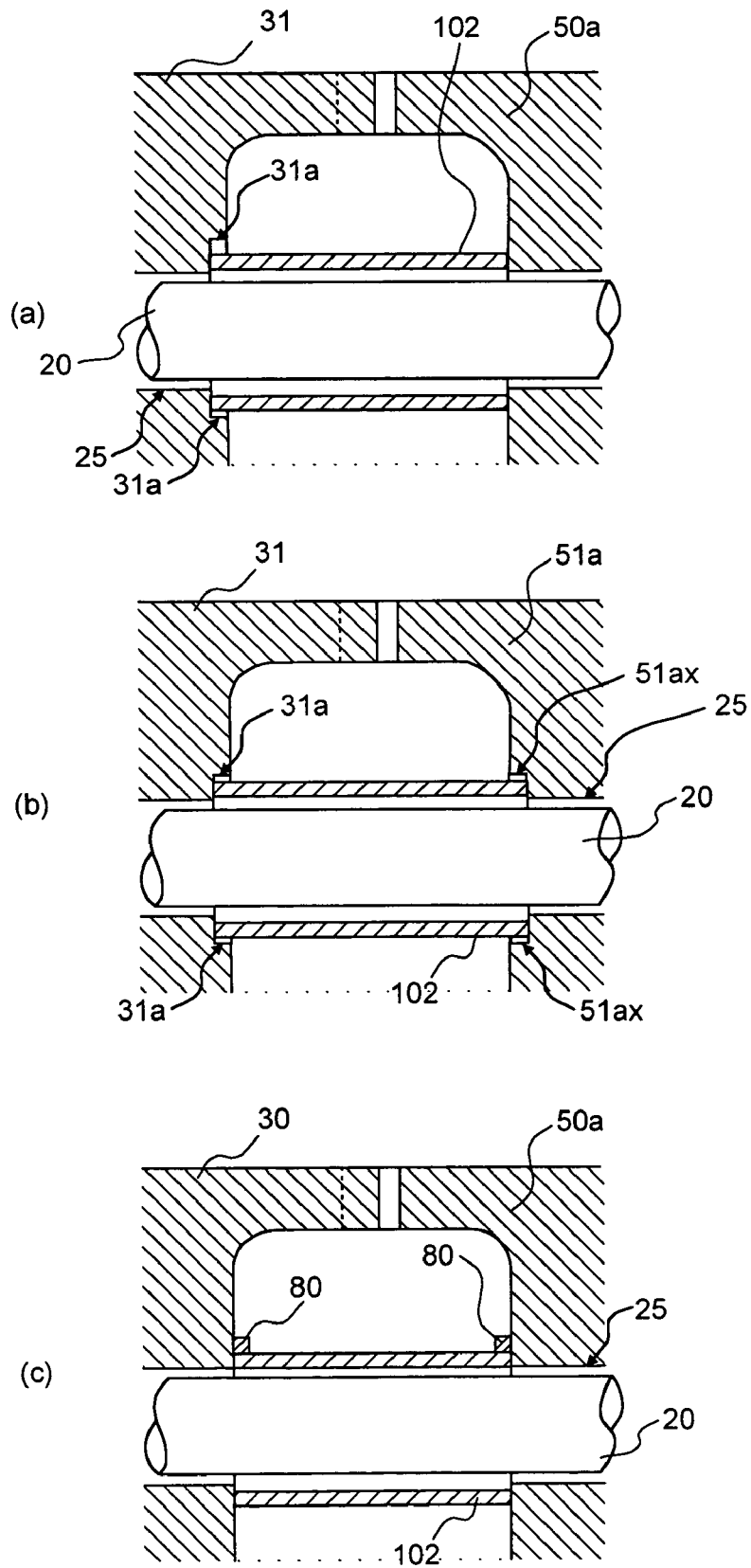
FIG. 5 is a local sectional view that shows a sealing structure of a spindle bolt according to a second modified example in the first embodiment.

FIG. 5 is a local sectional view that shows a sealing structure of a spindle bolt according to a second modified example in the first embodiment. The sealing structure of the spindle bolt has a feature in that machining such as spot facing is provided to the connecting member on the compressor side or the first stage rotor disk, to form a step, and the end of the tubular member is fitted therein to thereby prevent the tubular member from moving radially outwards of the rotor disk. The bolt hole 25 for the spindle bolt 20 is provided in a connecting member 31 on the compressor side used for this sealing structure. The outlet of the bolt hole 25 is subjected to spot facing machining, to form a step 31a. As shown in FIG. 5(a), the end of the tubular member 102 is fitted in this step 31a. For this tubular member 102, a tubular member having a sealing member 120 (see FIG. 4) explained in the first modified example may be used. By using this, the sealing performance can be further increased, and hence the steam leakage can be further reduced.

When the connecting member 31 on the compressor side rotates by the operation of the gas turbine, the tubular member 102 also rotates, and is subjected to a centrifugal force attributable to the rotation. Since the connecting member 31 on the compressor side and the first stage rotor disk 50a rotate at a speed as high as 3000 or 3600 rpm, the centrifugal force acting on the tubular member 102 becomes large. As a result, the tubular member 102 may move radially outward of the connecting member 31 on the compressor side, to thereby decrease the steam sealing performance. In the sealing structure of the spindle bolt according to this modified example, since the movement of the tubular member 102 can be hindered by the step 31a provided in the connecting member 31 on the compressor side, the steam sealing performance can be ensured even during the operation of the gas turbine. As a result, stable steam sealing performance can be exhibited, regardless of the operation condition of the gas turbine, to thereby minimize the steam leakage.

When the tubular member 102 moves in the radial direction of the first stage rotor disk 50a, the balance of the rotating system is lost, and the spindle vibration may exceed a tolerance. Thereby, a trip (suspension) of the gas turbine may occur. However, by this modified example, such radial movement of the tubular member 102 can be hindered, and hence the balance of the rotating system is hardly affected. Therefore, even if the tubular member 102 is provided, the spindle vibration can be suppressed within the tolerance, and hence a trip of the gas turbine can be avoided.

In the example, the step 31a is provided only in the connecting member 31 on the compressor side, but as shown in FIG. 5(b), spot facing machining may be also applied to the bolt hole 25 in the first stage rotor disk 51a, to provide a step 51ax. By providing the step 51ax, the movement of this member can be received by the opposite ends of the tubular member 102, and hence the movement of the tubular member 102 can be inhibited more stably. FIG. 5(c) shows another method for inhibiting the movement of the tubular member 102. As shown in this figure, a protrusion 80 is provided at the outlet of the bolt hole 25, to prevent the movement of the tubular member 102 by this protrusion 80.

Third Modified Example

Figure 6:
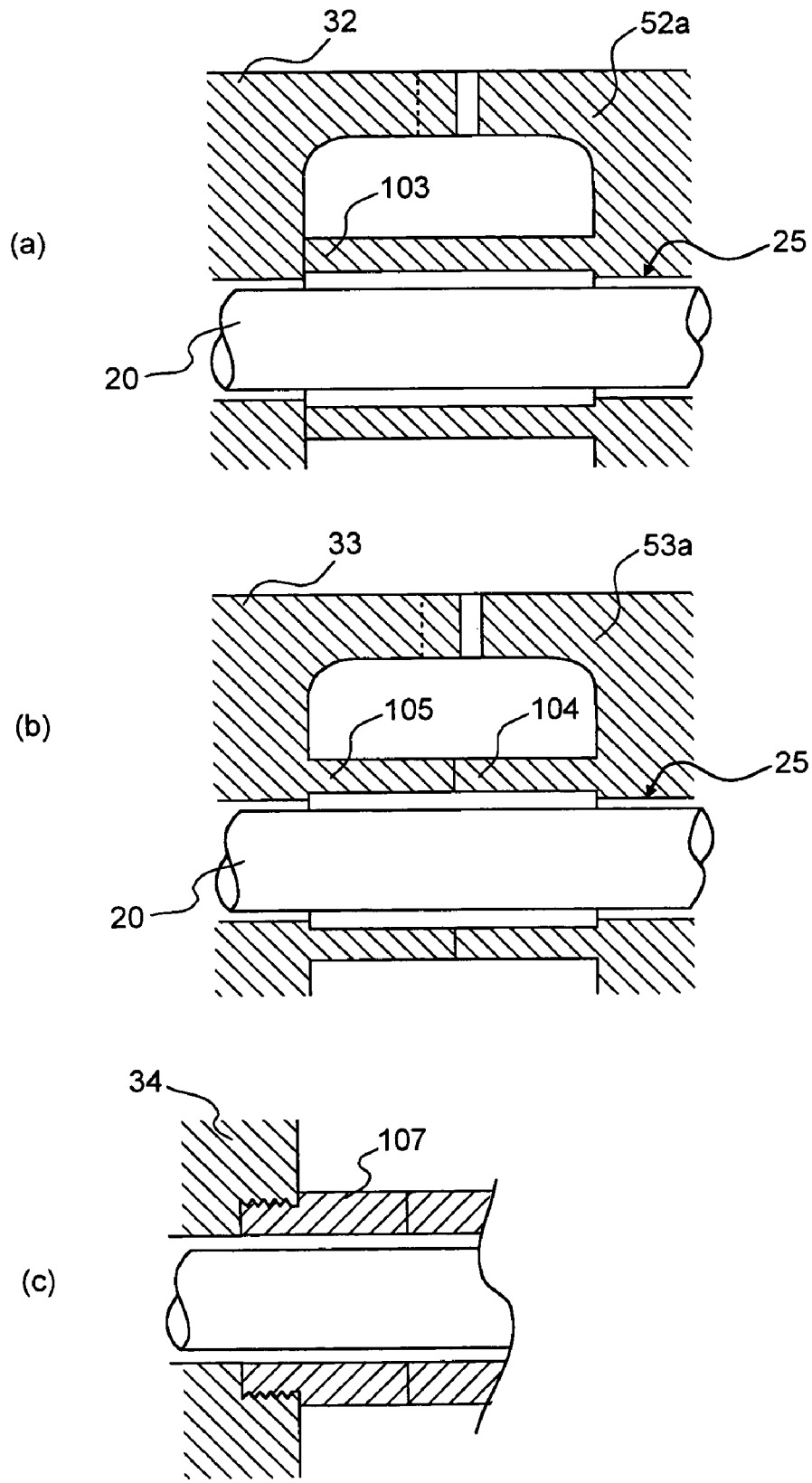
FIG. 6 is a local sectional view that shows a sealing structure of a spindle bolt according to a third modified example in the first embodiment.

FIG. 6 is a local sectional view that shows a sealing structure of a spindle bolt according to a third modified example in the first embodiment. The sealing structure of the spindle bolt has a feature in that a tubular member covering the spindle bolt is integrally formed at least on one side of the connecting member on the compressor side and the first stage rotor disk. FIG. 6(a) shows an example in which a tubular member 103 is formed in a first stage rotor disk 52a. FIG. 6(b) shows an example in which tubular members 104 and 105 are respectively formed in a first stage rotor disk 53a and a connecting member 33 on the compressor side, and the ends of the tubular members 104 and 105 are made to abut on each other, to thereby seal the steam leakage from the bolt hole 25.

In this sealing structure according to this modified example, in addition to the action and effect exhibited by the sealing structure according to the first embodiment, the first stage rotor disk 52a and the tubular member 103 and the like are integrally formed, and hence a deviation of the tubular member 103 does not occur. Therefore, it is not necessary to provide deviation preventing means for the tubular member 103, and hence the structure becomes simple, and the reliability can be increased. Further, since it has an integral structure, the strength can be also increased, to thereby improve the durability. The sealing member may be provided on the sealing plane where the tubular member 103 or the like comes in contact with the connecting member 32 on the compressor side or the like. Such a structure helps to increase the steam sealing performance, reduce the steam leakage, and hence improve the thermal efficiency of the gas turbine. As shown in FIG. 6(c), the configuration may be such that an external thread is provided in a tubular body 107, an internal thread engaging therewith is provided in a connecting member 34 on the compressor side, and the tubular body 107 is screwed therein to form a tubular member. By having such a configuration, machining becomes easy, and even when the tubular body 107 is broken, replacement becomes easy.

Second Embodiment

Figure 7:
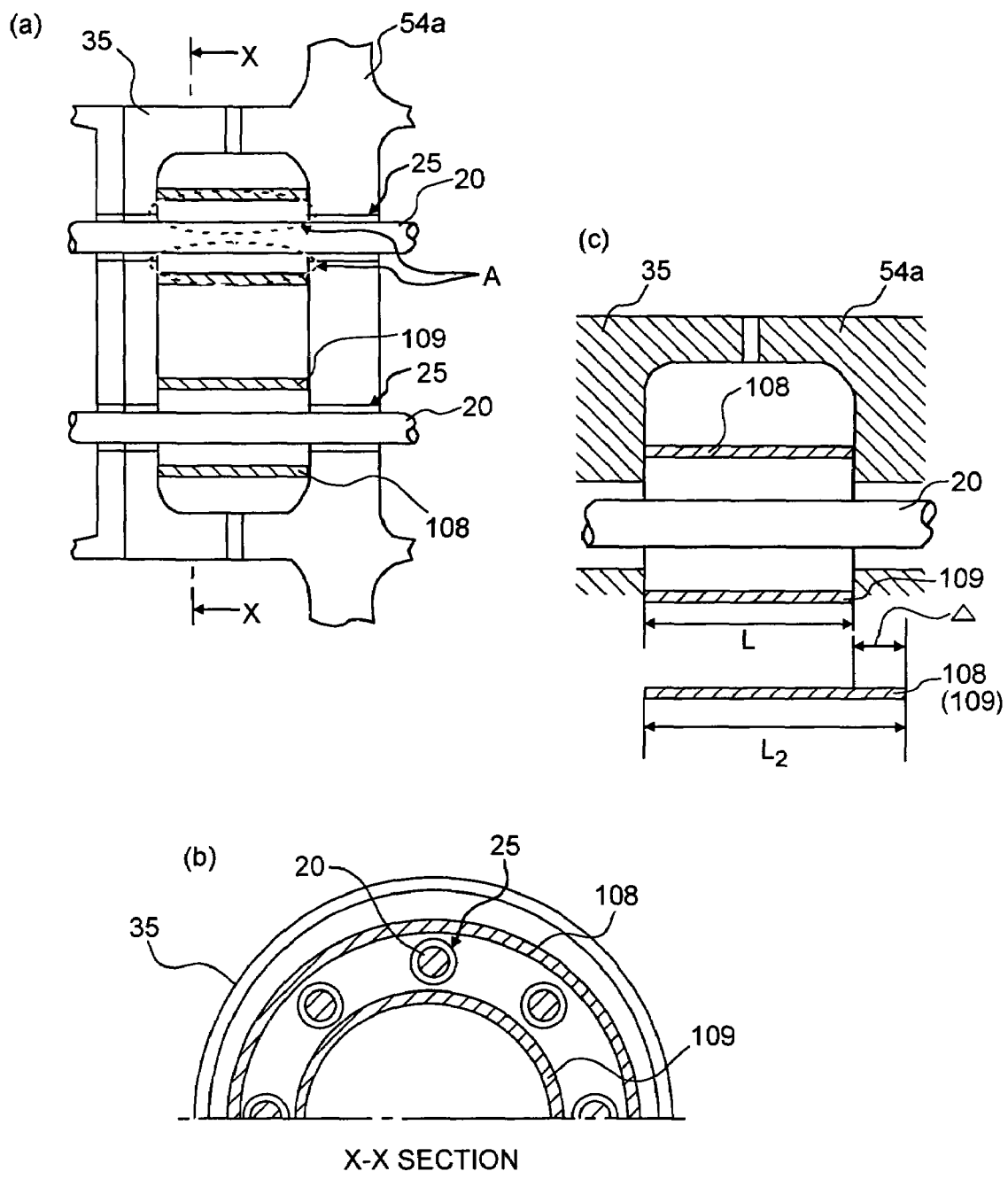
FIG. 7 is a local sectional view that shows a sealing structure of a spindle bolt according to a second embodiment.

FIG. 7 is a local sectional view that shows a sealing structure of a spindle bolt according to a second embodiment. In this sealing structure, two annular members having a different diameter are provided between the connecting member on the compressor side and the first stage rotor disk, and a spindle bolt is passed between these two annular members, to thereby fix the connecting member on the compressor side and the first stage rotor disk. It has a feature in that the steam leaking from the bolt hole provided in the first stage rotor disk is sealed by the two annular members.

Two annular members 108 and 109 having a different diameter are provided between a connecting member 35 on the compressor side and a first stage rotor disk 54a. Spindle bolts 20 pass between the annular member 109 having a small diameter and the annular member 108 having a large diameter, to fasten the connecting member 35 on the compressor side and the first stage rotor disk 54a. As shown in FIG. 7(c), the length L2 of the annular members 108 and 109 is slightly larger than a gap L between the connecting member 35 on the compressor side and the first stage rotor disk 54a, and the annular members shrink by a shrinkage allowance $\Delta=L2-L$, by fastening the spindle bolts 20. Since the working face can be compressed by this shrinkage allowance $\Delta$, stable sealing performance can be exhibited, regardless of the operation condition of the gas turbine.

As explained in the first embodiment, a sealing member (not shown) may be provided at the ends of the annular members 108 and 109. Since the steam sealing performance can be increased by this sealing member, the waste of steam can be reduced than when the sealing member is not provided, and hence it is preferable. As the material of this sealing member, one explained in the first embodiment can be applied.

The steam on the first stage rotor disk 54a tends to leak towards the compressor side, from the gap between the bolt hole 25 provided in the rotor disk and the spindle bolt 20. However, the steam stays in a space A (a portion surrounded by a dotted line in FIG. 7) formed between the annular members 108 and 109 having a different diameter, and does not leak outside of this space A, and hence the steam leaking from the first stage rotor disk 54a can be sealed. As a result, the waste of steam can be further reduced, and the thermal efficiency of the gas turbine can be further increased.

FIG. 8 shows an example of an annular member. FIG. 8(a) shows octagonal annular members 108a and 109a, and FIG. 8(b) shows hexagonal annular members 108b and 109b. The annular members include not only the annular member in which a section thereof vertical to the axial direction is circular, but also annular members in which the section thereof vertical to the axial direction is polygonal such as octagonal or hexagonal. As shown in FIG. 8(c), an annular member 108c in which the section thereof vertical to the axial direction is substantially stelliform is also included. As a combination of the annular members, the same type of shapes may be combined, such as a combination of a round shape and a round shape, or different shapes may be combined, such as a combination of a round shape and a polygon.

First Modified Example

FIG. 9 is a sectional view that shows a first modified example in the second embodiment. As shown in FIG. 9(a), a step 55ax or the like may be provided in a first stage rotor disk 55a or the like, so that the step 55ax inhibits the annular members 108 and 109 from moving radially. As shown in FIG. 9(b), a protrusion 81 may be provided instead of the step 55ax, to inhibit the radial movement of the annular members 108 and 109. In this manner, preventing the radial movement of the annular members 108 and the like, demonstrates stable sealing performance. Further, this suppresses the change in rotation balance due to the movement of the annular member 108 and the like, and therefore avoids a trip of the gas turbine due to an increase of the spindle vibration. As a result, the gas turbine can be stably operated, while suppressing the steam leakage as much as possible.

If the section of the annular member is made circular, the centrifugal force acts on the annular member substantially uniformly, and hence the movement due to the centrifugal force decreases than in the case of the tubular member explained in the first embodiment. Therefore, the sealing performance can be ensured, and the spindle vibration can be kept within a tolerance limit, without providing shift preventing means such as the step 55ax, depending on the design.

Second Modified Example

Figure 10:
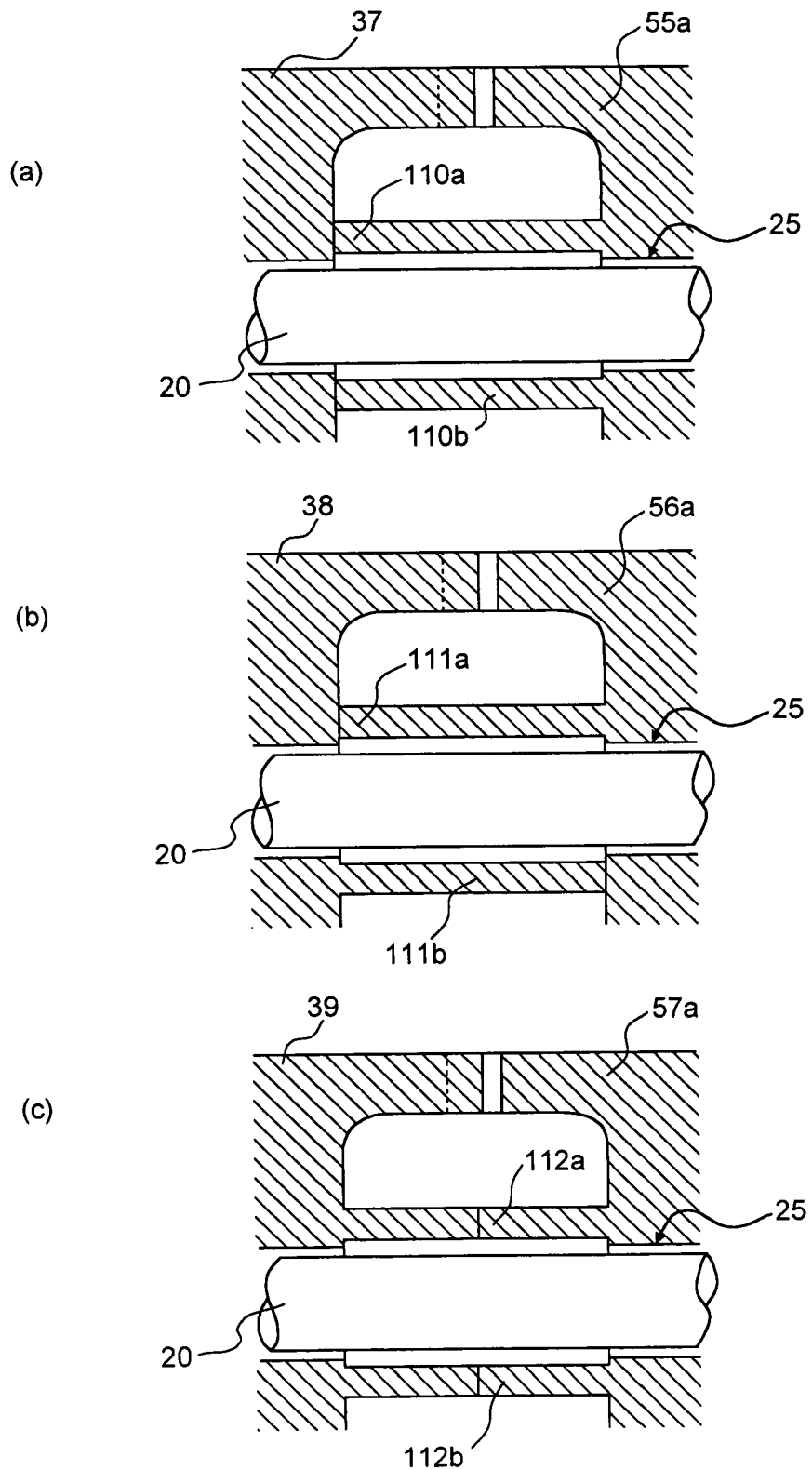
FIG. 10 is a local sectional view that shows a sealing structure of a spindle bolt according to a second modified example of the second embodiment.

FIG. 10 is a local sectional view that shows a sealing structure of a spindle bolt according to a modified example of the second embodiment. The sealing structure of the spindle bolt according to this modified example has a feature in that the annular member is integrally formed at least on one side of the connecting member on the compressor side and the first stage rotor disk. FIG. 10(a) shows an example in which annular members 110a and 110b having a different diameter are formed in a first stage rotor disk 55a, and FIG. 10(b) shows an example in which an annular member 111a, 111b is respectively formed in a first stage rotor disk 56a and a connecting member 38 on the compressor side. FIG. 10(c) shows an example in which annular members 112a and 112b having a different diameter are formed respectively in a first stage rotor disk 57a and a connecting member 39 on the compressor side, and the ends thereof are made to abut on each other, to prevent the steam leakage from the bolt hole 25.

In the sealing structure according to this modified example, in addition to the action and effect exhibited by the sealing structure according to the second embodiment, the first stage rotor disk 55a and the annular member 110a and the like are integrally formed, and hence a deviation of the annular member 110a and the like do not occur. Therefore, it is not necessary to provide deviation preventing means for the annular member 110a and the like, and hence the structure becomes simple, and the reliability can be increased. Further, since it has an integral structure, the strength can be also increased, to thereby improve the durability. The sealing member explained in the first embodiment and the like may be provided on the sealing plane where the annular member 110a or the like comes in contact with the connecting member 37 on the compressor side or the like. By having such a structure, the steam sealing performance can be further increased, and the steam leakage can be reduced by this, and hence the thermal efficiency of the gas turbine can be improved.

Third Embodiment

Figure 11:
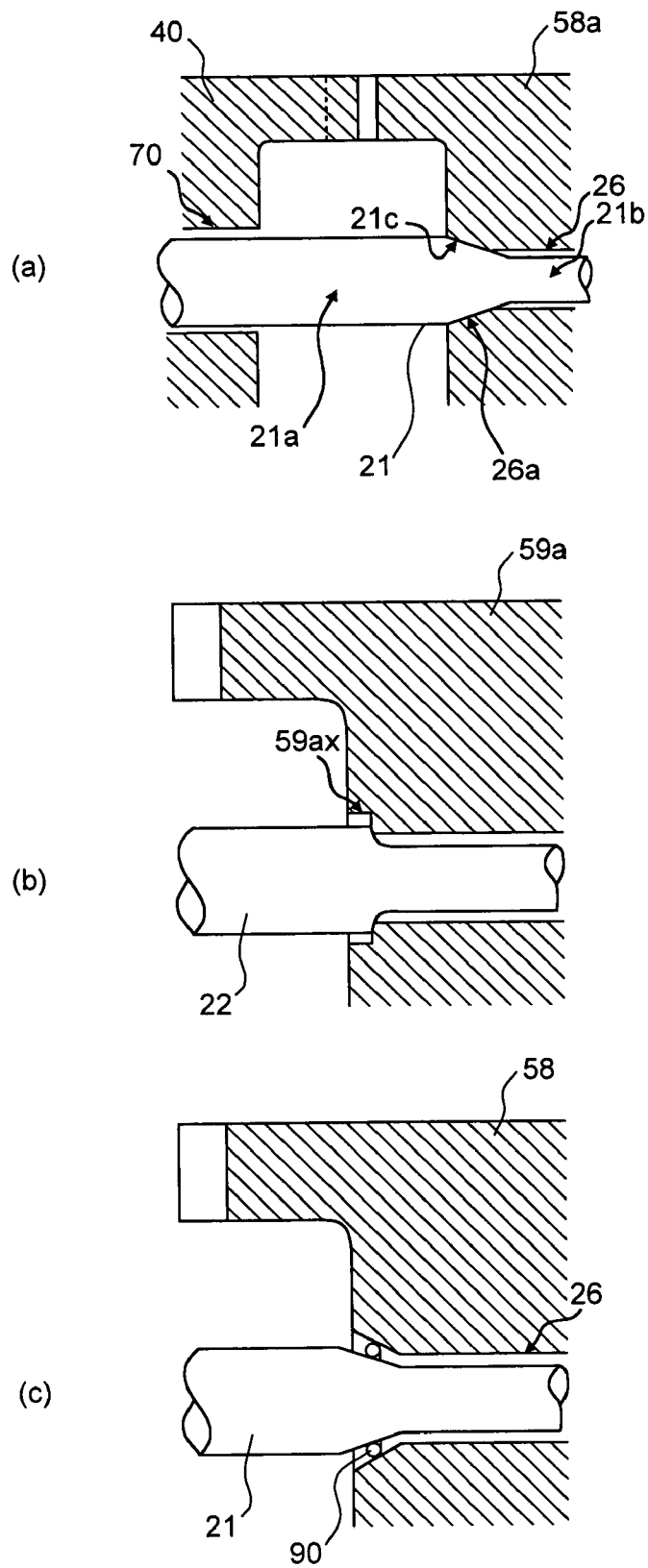
FIG. 11 is a local sectional view that shows a sealing structure of a spindle bolt according to a third embodiment of the present invention.

FIG. 11 is a local sectional view that shows a sealing structure of a spindle bolt according to a third embodiment of the present invention. This sealing structure has a feature in that the bolt hole provided in the first stage rotor disk is adhered to the spindle bolt, to thereby seal the steam leaking from the through hole. As shown in FIG. 11(a), a bolt hole 26 for passing a spindle bolt 21 therethrough is provided in a first stage rotor disk 58a, and a taper 26a is formed at the opening of the bolt hole 26. The spindle bolt 21 comprises a large diameter portion 21a and a small diameter portion 21b, and a taper 21c similar to the taper 26a is formed between the large diameter portion 21a and the small diameter portion 21b. A bolt hole 70 larger than the large diameter portion 21a is formed in a connecting member 40 on the compressor side, so that the large diameter portion 21a of the spindle bolt 21 can pass therethrough.

The spindle bolt 21 is inserted into the bolt hole 26 provided in the first stage rotor disk 58a, so that the taper 21c of the spindle bolt 21 comes in contact with the taper 26a of the bolt hole 26. Though it is not clear from FIG. 11, the spindle bolt 21 passes through from a second stage rotor disk to a third stage rotor disk. The first stage to the third stage rotor disks are fixed by fastening a nut from outside of the third stage rotor disk. The taper 21c of the spindle bolt 21 is allowed to adhere more firmly to the taper 26a of the bolt hole 26 provided in the first stage rotor disk 58a, by fastening the nut.

The steam on the first stage rotor disk 58a side tends to leak towards the compressor side through a gap between the bolt hole 26 and the spindle bolt 21. In this sealing structure, however, since the taper 26a of the bolt hole 26 and the taper 21c of the spindle bolt 21 adhere to each other, the leakage of the steam in this part can be prevented. If a sealing member is provided between the spindle bolt 21 and the bolt hole 26, the sealability can be further increased, which is preferable. Alternatively, as shown in FIG. 11(b), a step 59ax may be provided in a first stage rotor disk 59a, so as to abut on a step provided in a spindle bolt 22, to thereby seal the steam, without using the taper. Further, as shown in FIG. 11(c), a sealing member 90 may be arranged between the spindle bolt 21 and the bolt hole 26, so that the internal surface of the bolt hole 26 and the outer circumference of the spindle bolt 21 come in line contact with this sealing member, to thereby seal the steam. According to such a line contact, the steam sealing performance can be increased than by a surface contact, and machining becomes easy, which is preferable. In this sealing structure, since neither a tubular member nor an annular member as in the above sealing structures is required, steam leakage can be prevented with a small number of parts. Further, since the tubular member or the like is not used, the rotation balance is hardly lost, and a trip of the gas turbine due to the spindle vibration hardly occurs, thereby enabling stable operation.

Modified Example

Figure 12:
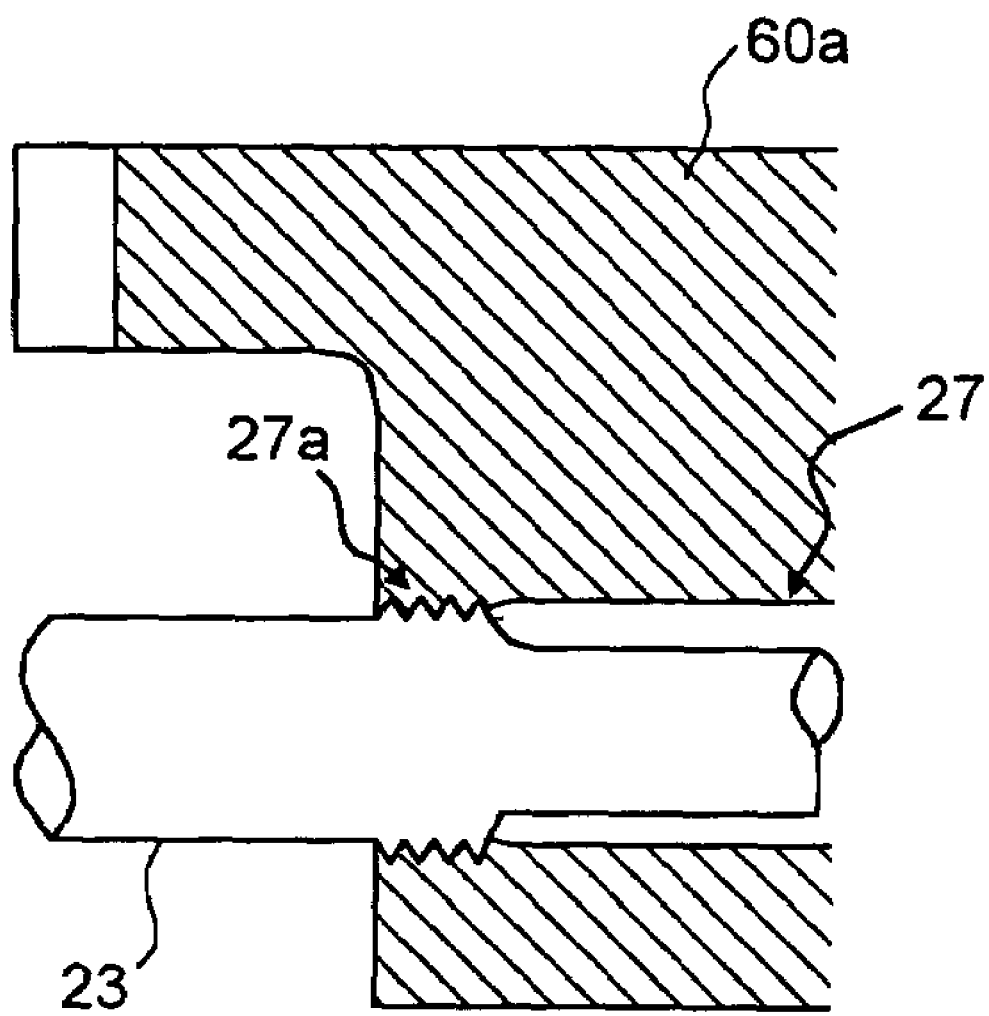
FIG. 12 is a local sectional view that shows a sealing structure of a spindle bolt according to a modified example of the third embodiment.

FIG. 12 is a local sectional view that shows a sealing structure of a spindle bolt according to a modified example of the third embodiment. This sealing structure has a feature in that in the sealing structure, an internal thread is provided at an opening 27a of a bolt hole 27 provided in a first stage rotor disk 60a, an external thread engaging with the internal thread is provided on a spindle bolt 23, and the both screws are fastened at the opening 27a of the bolt hole 27 to seal the steam.

The steam on the first stage rotor disk 60a side leaks through a gap between the bolt hole 27 and the spindle bolt 23. In this sealing structure, however, since the spindle bolt 23 and the bolt hole 27 are fastened by the screw, the steam is sealed in this part. Particularly in this sealing structure, since the steam is sealed by the screw, the sealing performance becomes considerably high, as compared with the sealing means such as the surface contact or the line contact described above. Therefore, steam leakage can be prevented substantially completely, and hence the steam can be used for cooling the rotor blade without being wasted. Further, in the sealing structure, the adhesion between the spindle bolt 21 and the like and the bolt hole 26 and the like becomes weak due to the thermal expansion of the spindle bolt (see FIG. 11), and as a result, the steam leakage may occur. In this sealing structure, however, since the spindle bolt 23 and the bolt hole 27 are fastened by the screw, the sealing performance can be stably exhibited, regardless of the expansion of the spindle bolt 23.

Fourth Embodiment

Figure 13:
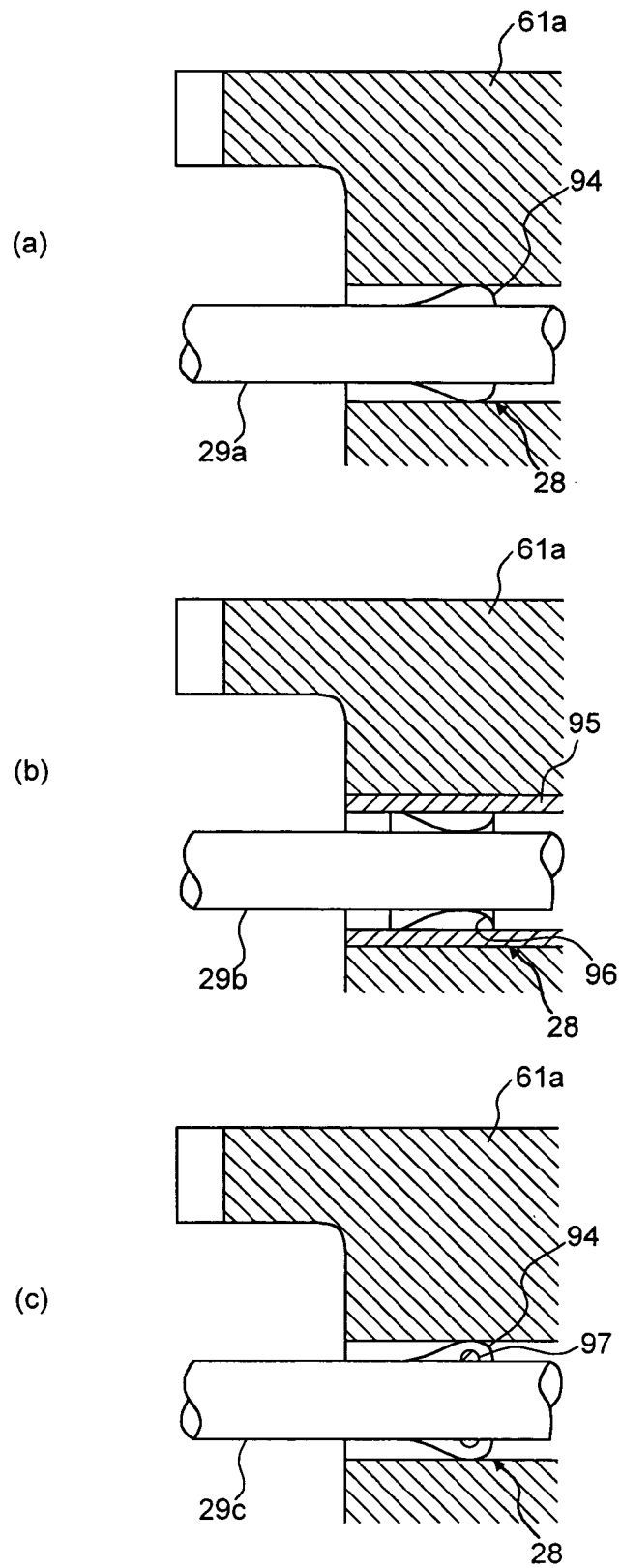
FIG. 13 is a local sectional view that shows a sealing structure of a spindle bolt according to a fourth embodiment of the present invention.

FIG. 13 is a local sectional view that shows a sealing structure of a spindle bolt according to a fourth embodiment of the present invention. This sealing structure has a feature in that an elastic member that can deform in the radial direction of the spindle bolt is provided between a spindle bolt and a through hole provided in a first stage rotor disk, to thereby prevent steam leakage. On the side of a spindle bolt 29a according to the fourth embodiment, a spherical elastic strengthening member 94 is provided. The internal surface of a bolt hole 28 provided in a first stage rotor disk 61a comes in contact with the spherical elastic strengthening member 94, to thereby seal the steam. This spherical elastic strengthening member 94 is made of a metal material, since a heat resistance and elasticity are required in the spherical elastic strengthening member 94, and for example, it is manufactured from a nickel base alloy or the like. The elastic strengthening member 94 is fitted to a spindle bolt 29a by welding or the like. The elastic strengthening member 94 may be provided on the bolt hole 28 side. In this case, as shown in FIG. 13(b), if the structure is such that a tube 95 fitted with an elastic strengthening member 96 is inserted into the bolt hole 28, and a spindle bolt 29b is inserted into this tube 95, repair and replacement become easy, when the elastic strengthening member 96 is damaged, which is preferable.

FIG. 13(a) will be referenced next for explanation. When the spindle bolt 29a is inserted into the bolt hole 28 in the first stage rotor disk 61a, the side of the elastic strengthening member 94 comes in contact with the internal surface of the bolt hole 28. Since the elastic strengthening member 94 can deform radially, even if the spindle bolt 29a moves radially, the elastic strengthening member 94 can absorb the movement and maintain the steam sealing performance. The steam leaking through a gap between the spindle bolt 29a and the bolt hole 28 is sealed by the elastic strengthening member 94, and hence steam hardly leaks towards the compressor. This sealing structure does not use a tubular member or the like as in the sealing structure according to the first embodiment and the like, and hence the rotation balance is hardly lost. As a result, the steam leakage can be reduced as much as possible, while keeping a trip of the gas turbine to a minimum.

As shown in FIG. 13(c), a protrusion 97 may be provided on the side of the spindle bolt 29c and inside the elastic strengthening member 94, to restrict the radial deformation of the elastic strengthening member 94. It is preferable, because a damage resulting from an increase of the deformation of the elastic strengthening member 94 can be suppressed by this protrusion. Further, a hard coating may be applied on the internal surface of the bolt hole 28, so as to protect the internal surface of the bolt hole 28 from fretting wear due to the contact with the elastic strengthening member 94. By applying the hard coating, the wear on the internal surface of the bolt hole 28 hardly occurs, thereby the durability increases, and time and energy are not required for the maintenance, which is preferable. As the hard coating, a TiC or TiN layer may be physically formed by physical vapor deposition (PVD), other than chromium plating. Further, high-carbon high chrome steel, high manganese steel, a Co—Cr—W alloy (Stellite) or the like may be welded by a hard facing processing.

Figure 14:
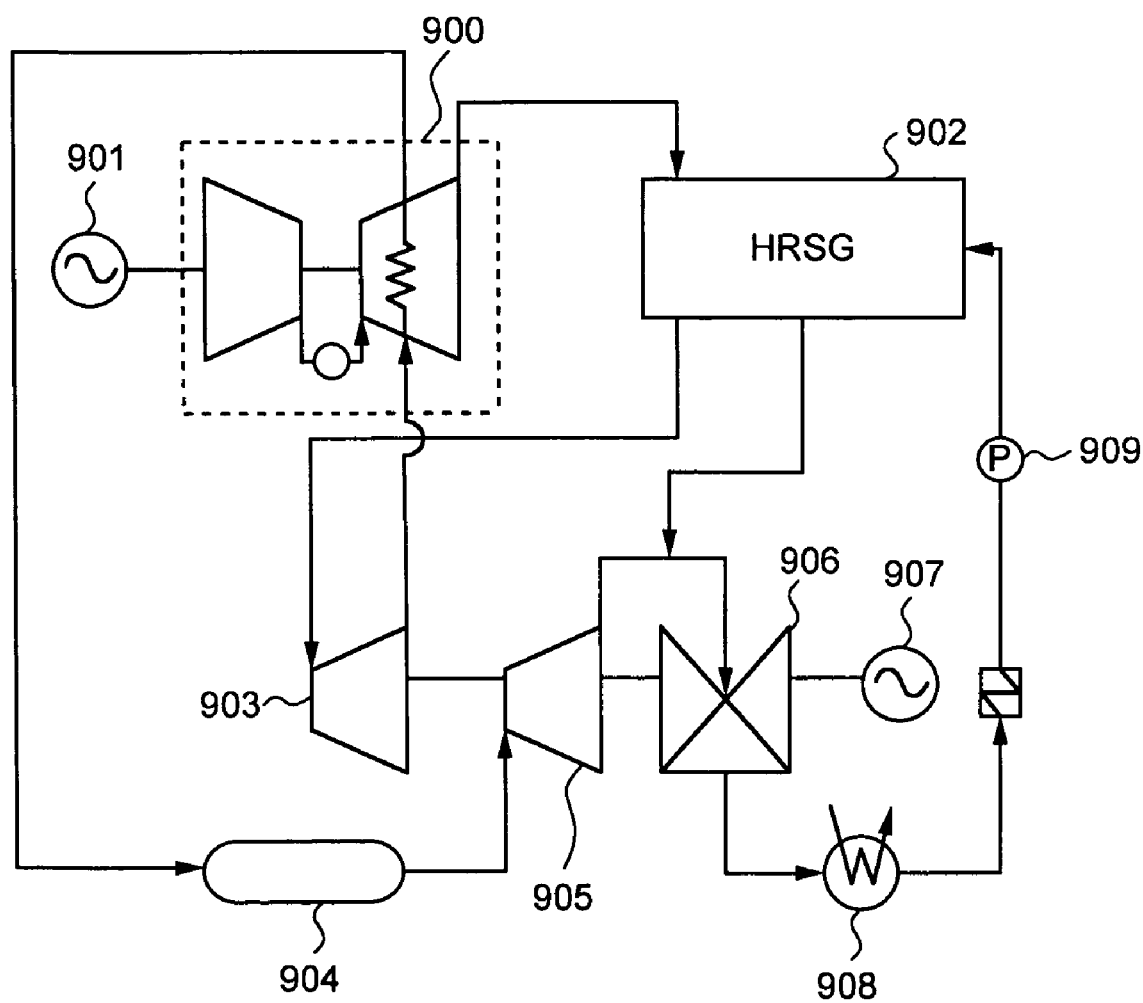
FIG. 14 is a schematic diagram that shows a steam and gas turbine combined cycle power plant adopting steam cooling for cooling hot members.
Figure 15:
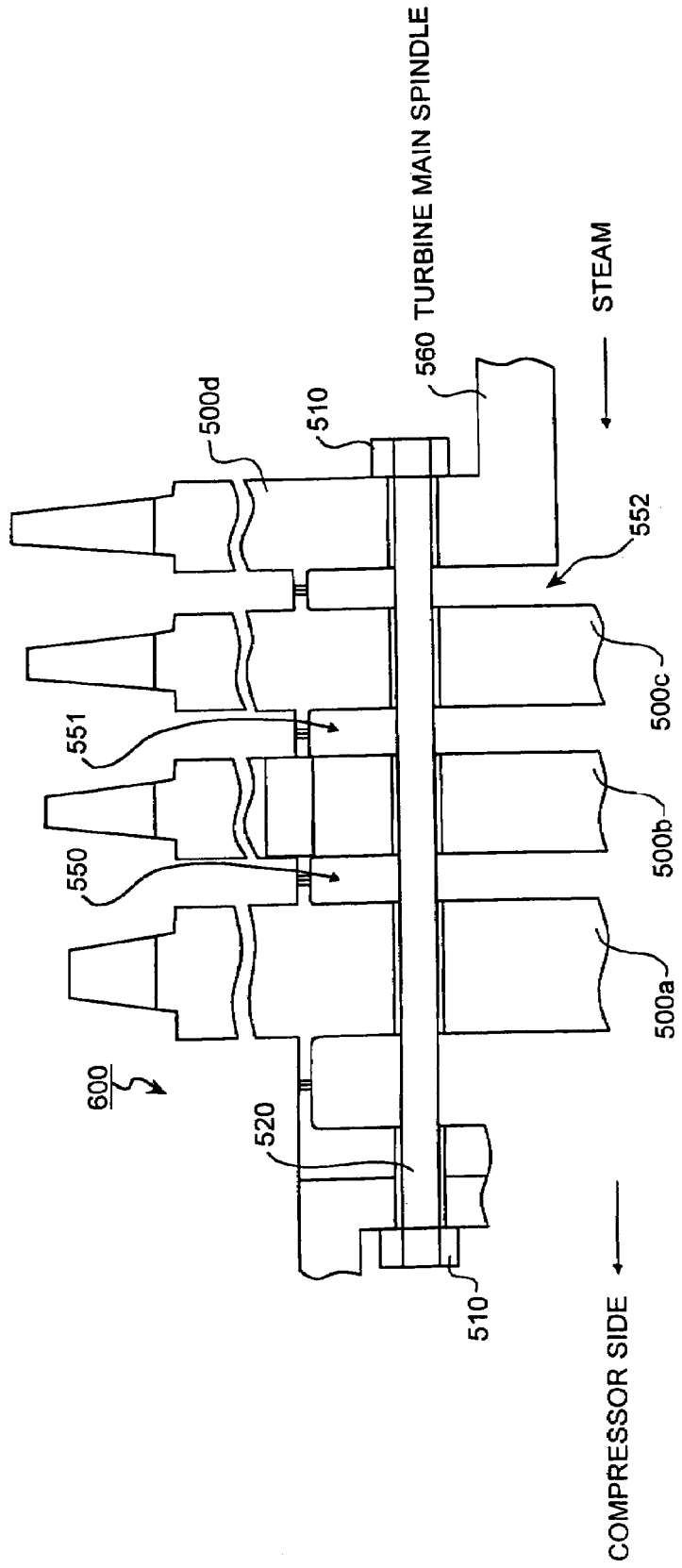
FIG. 15 shows a rotor disk of a gas turbine conventionally used.

FIG. 14 is a schematic diagram that shows a stem and gas turbine combined cycle power plant adopting steam cooling for cooling the hot members. In this stem and gas turbine combined cycle power plant, thermal energy contained in the exhaust gas of the gas turbine is recovered by a heat recovery steam generator (HRSG). Steam is generated by the thermal energy in the recovered exhaust gas of the gas turbine, to drive a steam turbine by the high temperature and high pressure steam, to thereby generate power by a generator connected thereto. In this manner, in the stem and gas turbine combined cycle power plant, since exhaust heat of the gas turbine can be effectively used, the thermal efficiency as the whole plant can be increased.

Though it is not apparent from FIG. 14, this gas turbine 900 uses steam for cooling hot members, such as rotor and stationary blades and rotor disks. Though it is not apparent from FIG. 14, a turbine in which any one of the sealing structures of the spindle bolt explained in the first to the fourth embodiments is used in this gas turbine 900. The gas turbine 900 is connected to a first generator 901, and the gas turbine 900 drives the first generator 901 to generate power. The exhaust gas of the gas turbine 900 has a temperature of about several hundred degrees, and hence this exhaust gas is guided to the HRSG 902, to generate steam.

The steam generated in the HRSG 902 is first guided to a high pressure steam turbine 903, to drive this. The exhaust steam of the high pressure steam turbine 903 is guided to the gas turbine 900, and used for cooling hot members, such as the rotor blade and the stationary blade. The steam having cooled the hot members in the gas turbine 900 is guided to a mixing chamber 904 and supplied to an intermediate pressure steam turbine 905. The steam having driven the intermediate pressure steam turbine 905 is supplied to a low pressure steam turbine 906 to drive this. The high pressure steam turbine 903, the intermediate pressure steam turbine 905, and the low pressure steam turbine 906 are serially connected, to rotate a second generator 907 connected with the output shafts thereof, to thereby generate power.

The steam having driven the intermediate pressure steam turbine 905 and the low pressure steam turbine 906 is recovered to a water form by a steam condenser 908, and then supplied again to the HRSG 902 by a pump 909. The water is turned into steam again by an evaporator (not shown) provided in the HRSG 902, superheated by a superheater (not shown), and then supplied to the high pressure steam turbine 903 to repeat the process.

In this stem and gas turbine combined cycle power plant, the gas turbine 900, to which any one of the sealing structures of the spindle bolt explained in the first to the fourth embodiments is applied, is used. Therefore, since the amount of steam leaking through a gap between the spindle bolt and the bolt hole can be reduced, precious steam can be effectively used, thereby suppressing a loss to a minimum. As a result, the thermal efficiency of the steam and gas turbine combined cycle power plant can be improved.

As explained above, in the sealing structure of the spindle bolt of this invention, the circumference of the spindle bolt is covered with a tubular member, so that the steam leaking through the bolt hole provided in the first stage rotor disk is sealed by this tubular member. Therefore, the steam leakage is reduced, and the steam can be effectively used, and hence the operation cost can be reduced. Further, the cooling steam is generated from exhaust gas of the gas turbine, and after having cooled the rotor blade, the steam drives the intermediate pressure steam turbine and the like. The steam leakage in this part can be reduced, and a decrease in the output of the steam turbine can be suppressed. As a result, the thermal efficiency as the steam and gas turbine combined cycle power plant is improved.

In the sealing structure of the spindle bolt of the present invention, two annular members having a different diameter are provided between the first stage rotor disk and the connecting member on the compressor side, and a spindle bolt is made to penetrate between these two annular members, to thereby prevent the steam leaking from the bolt hole, through which the spindle bolt passes. Therefore, since the steam leakage is reduced to effectively use the steam, the operation cost can be reduced by this. Further, since the consumption of the steam in this part can be reduced, the thermal efficiency as the steam and gas turbine combined cycle power plant is improved.

In the sealing structure of the spindle bolt of the present invention, a metal or ceramics sealant is provided at the end of the tubular member or the annular member, to increase the steam sealing performance. Therefore, since the steam leakage can be further reduced, the steam can be used more effectively, and hence the thermal efficiency as the steam and gas turbine combined cycle power plant is improved.

In the sealing structure of the spindle bolt of the present invention, a step or the like is provided in the first stage rotor disk or the like, to prevent the tubular member or the annular member from moving radially outwards of the rotor disk due to the centrifugal force. Since the rotor disk of the gas turbine rotates at a high speed, the structural members in the rotating system are subjected to a large centrifugal force. When the tubular member or the annular member is eccentric due to the centrifugal force, the rotation balance is lost and spindle vibration increases, thereby a trip of the gas turbine may occur. In this sealing structure, since the movement of the tubular member or the like is hindered by making the step or the like abut on the tubular member, a deviation of the tubular member or the like can be suppressed. As a result, since the gas turbine can be operated without losing the rotation balance, a trip of the gas turbine can be suppressed.

In the gas turbine according to the present invention, the circumference of the spindle bolt is covered with a tubular member, and the steam leaking through the bolt hole provided in the first stage rotor disk is sealed by this tubular member. Thereby, the steam leakage in the spindle bolt can be reduced, and hence in this gas turbine, wastefulness of the cooling steam can be suppressed. Further, in a steam and gas turbine combined cycle power plant using this gas turbine, the thermal efficiency can be increased.

In the gas turbine according to the present invention, two annular members having a different outer dimension are arranged between the first stage rotor disk and the connecting member on the compressor side, and the spindle bolt is passed between these two annular members, to prevent the steam leaking from a bolt hole, through which the spindle bolt passes. Therefore, steam leakage in the spindle bolt can be reduced to suppress wastefulness of the cooling steam. Further, in a steam and gas turbine combined cycle power plant using this gas turbine, the thermal efficiency can be increased.

INDUSTRIAL APPLICABILITY

As described above, the sealing structure of the spindle bolt and the gas turbine according to the present invention are useful for a gas turbine that uses steam as a cooling medium for hot members such as a rotor blade and a rotor disk, and are suitable for increasing the efficiency, by reducing leakage of the steam and increasing the use efficiency of the steam.

What is claimed is:

1. A sealing structure of a spindle bolt in a gas turbine having a steam feed path provided in a turbine main spindle, wherein rotor disks and a connecting member on a compressor side are fixed by a spindle bolt which is disposed off the rotational axis of the rotor disks, and between a first stage rotor disk and the connecting member on the compressor side, a circumference of the spindle bolt is covered with a tubular member in which a section thereof vertical to the axial direction includes a section of a bolt hole for passing the spindle bolt therethrough, and ends of the tubular member are made to abut resiliently on the first stage rotor disk and the connecting member on the compressor side, respectively.

2. The sealing structure of a spindle bolt according to claim 1, wherein a sealant is provided at least on one side between the end of the tubular member or the annular member and the first stage rotor disk, and between the end of the tubular member or the annular member and the connecting member on the compressor side.

3. The sealing structure of a spindle bolt according to claim 1, wherein a protrusion or a step that hinders the tubular member from moving radially outwards of the rotor disk, is provided at least on one side of the first stage rotor disk and the connecting member on the compressor side.

4. A gas turbine that has a plurality of rotor disks having a rotor blade on a periphery thereof, and a steam feed path for supplying steam which cools the rotor blade or the rotor disks, and other members to be heated, the gas turbine comprising:
   a compressor that compresses air to produce combustion air;
   a combustor that supplies fuel to the combustion air produced by the compressor to generate combustion gas; and
   a turbine main spindle having the steam feed path or a recovery path for the steam therein, in which the rotor disks and a connecting member located on the compressor side are fixed by a spindle bolt, wherein the spindle bolt is disposed off the rotational axis of the rotor disks, a circumference of the spindle bolt is covered with a tubular member in which a section thereof vertical to an axial direction includes a section of a bolt hole for passing the spindle bolt therethrough, between a first stage rotor disk and the connecting member, and opposite ends of the tubular member are made to abut resiliently on the first stage rotor disk and the connecting member on the compressor side, respectively.

5. The gas turbine according to claim 4, wherein an additional sealant is provided between the end of the tubular member and the connecting member on the compressor side.

6. The gas turbine according to claim 4, wherein a protrusion or a step that hinders the tubular member from moving radially outwards of the rotor disk, is provided at least on one side of the first stage rotor disk and the connecting member on the compressor side.

7. A sealing structure of a spindle bolt, wherein rotor disks and a connecting member on a compressor side are fixed by a spindle bolt, and between a first stage rotor disk and the connecting member on the compressor side, of a turbine rotor in a gas turbine having a steam path therein, a circumference of the spindle bolt is covered with a tubular member in which a section thereof vertical to the axial direction includes a section of a bolt hole for passing the spindle bolt therethrough, and ends of the tubular member are made to abut on the first stage rotor disk and the connecting member on the compressor side, respectively, wherein a sealant is provided between the end of the tubular member and the connecting member on the compressor side.

8. The sealing structure of a spindle bolt according to claim 7, wherein a protrusion or a step that hinders the tubular member from moving radially outwards of the rotor disk, is provided at least on one side of the first stage rotor disk and the connecting member on the compressor side.

9. A gas turbine that has a plurality of rotor disks having a rotor blade on a periphery thereof, which cools the rotor blade or the rotor disks, and other hot members by steam, the gas turbine comprising:
- a compressor that compresses air to produce combustion air;
- a combustor that supplies fuel to the combustion air produced by the compressor to generate combustion gas; and
- a turbine rotor having a feed path or a recovery path for the steam therein, in which the rotor disks and a connecting member located on the compressor side are fixed by a spindle bolt,
- wherein between a first stage rotor disk and the connecting member, a circumference of the spindle bolt is covered with a tubular member in which a section thereof vertical to an axial direction includes a section of a bolt hole for passing the spindle bolt therethrough, and opposite ends of the tubular member are made to abut on the first stage rotor disk and the connecting member on the compressor side, respectively, wherein a sealant is provided between the end of the tubular member and the connecting member on the compressor side.

10. The gas turbine according to claim 9, wherein a protrusion or a step that hinders the tubular member from moving radially outwards of the rotor disk, is provided at least on one side of the first stage rotor disk and the connecting member on the compressor side.

11. A gas turbine comprising:
- a compressor that compresses air to produce combustion air;
- a combustor that supplies fuel to the combustion air produced by said compressor to generate combustion gas;
- a turbine rotor having a path for steam cooling, said turbine rotor including a rotor disk and a connecting member that are fixed by a spindle bolt, said connecting member having an extended portion that is fixed to said rotor disk and forms a gap between said extended portion and the spindle bolt;
- a member provided in the gap and configured to cover a circumference of said spindle bolt, said member having a hole extending therethrough that is configured to allow said spindle bolt to pass therethrough, said member having a first end abutting said rotor disk and a second end abutting said connecting member; and
- a sealant provided at said first end of said member, said sealant being arranged between said first end and said rotor disk.

12. The gas turbine according to claim 11, further comprising an additional sealant provided at said second end of said member, said additional sealant being arranged between said second end and said connecting member.

13. A gas turbine comprising:
- a compressor that compresses air to produce combustion air;
- a combustor that supplies fuel to the combustion air produced by said compressor to generate combustion gas;
- a turbine rotor having a path for steam cooling, said turbine rotor including a rotor disk and a connecting member that are fixed by a spindle bolt, said connecting member having an extended portion that is fixed to said rotor disk and forms a gap between said extended portion and the spindle bolt;
- a member provided in the gap and configured to cover a circumference of said spindle bolt, said member having a hole extending therethrough that is configured to allow said spindle bolt to pass therethrough, said member having a first end abutting said rotor disk and a second end abutting said connecting member; and
- a sealant provided at said second end of said member, said sealant being arranged between said second end and said connecting member.

* * * * *